(12) United States Patent
Downs et al.

(10) Patent No.: US 9,249,872 B2
(45) Date of Patent: Feb. 2, 2016

(54) AXLE ASSEMBLY HAVING AN ANGULAR CONTACT BEARING THAT SUPPORTS A RING GEAR FOR ROTATION ON AN AXLE HOUSING

(71) Applicants: James P. Downs, South Lyon, MI (US); Paul J. Valente, Berkley, MI (US)

(72) Inventors: James P. Downs, South Lyon, MI (US); Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 23 days.

(21) Appl. No.: 14/294,221

(22) Filed: Jun. 3, 2014

(65) Prior Publication Data

US 2014/0274541 A1    Sep. 18, 2014

Related U.S. Application Data

(63) Continuation-in-part of application No. 14/205,535, filed on Mar. 12, 2014, now Pat. No. 9,157,515.

(60) Provisional application No. 61/787,547, filed on Mar. 15, 2013.

(51) Int. Cl.
*F16H 48/20*    (2012.01)
*F16H 48/08*    (2006.01)
*F16H 48/38*    (2012.01)

(52) U.S. Cl.
CPC ............ *F16H 48/08* (2013.01); *F16H 48/38* (2013.01); *F16H 2048/385* (2013.01)

(58) Field of Classification Search
CPC ... F16H 48/08; F16H 48/40; F16H 2048/426; F16H 2048/405; F16H 48/38; F16H 2048/385
See application file for complete search history.

(56) References Cited

U.S. PATENT DOCUMENTS

| | | | |
|---|---|---|---|
| 696,704 A | 4/1902 | Allen | |
| 1,987,716 A | 1/1935 | Skelton | |
| 2,609,710 A * | 9/1952 | Osborn | B60K 17/16 29/425 |
| 3,344,687 A | 10/1967 | Stockton | |
| 4,182,201 A | 1/1980 | Mayhew et al. | |
| 5,098,355 A | 3/1992 | Long | |
| 5,865,701 A * | 2/1999 | Sowa | F16H 48/08 475/86 |
| 6,056,663 A | 5/2000 | Fett | |
| 6,077,183 A * | 6/2000 | Tar | F16H 48/08 475/231 |
| 6,283,884 B1 * | 9/2001 | El-Kassouf | F16H 48/08 475/86 |
| 6,540,634 B2 | 4/2003 | Thompson | |
| 6,582,334 B1 * | 6/2003 | Noll | F16H 48/08 475/86 |
| 6,616,565 B1 | 9/2003 | Chen et al. | |
| 6,623,396 B2 | 9/2003 | Szalony et al. | |
| 6,645,113 B2 | 11/2003 | Orr et al. | |
| 6,652,408 B2 | 11/2003 | Rutt et al. | |

(Continued)

*Primary Examiner* — David J Hlavka
(74) *Attorney, Agent, or Firm* — Harness, Dickey & Pierce, P.L.C.

(57) ABSTRACT

An axle assembly that includes a housing, an input pinion, a ring gear, an angular contact bearing, and a differential assembly. The input pinion has a plurality of pinion teeth and is received in the housing for rotation about a first axis. The ring gear, which is received in the housing, is a bevel gear having ring gear teeth that define a pitch angle and are meshingly engaged with the pinion teeth. The angular contact bearing supports the ring gear for rotation on the housing about a second axis that is transverse to the first axis. The angular contact bearing has a first race, which is integrally formed into the ring gear, a second race, and a plurality of bearing balls disposed between the first and second races. The differential assembly has a differential case that is mounted to the ring gear for rotation therewith.

20 Claims, 2 Drawing Sheets

(56) References Cited

U.S. PATENT DOCUMENTS

| | | | |
|---|---|---|---|
| 6,695,739 B2 * | 2/2004 | Fett | F16H 48/08 475/230 |
| 6,699,154 B2 | 3/2004 | Orr et al. | |
| 6,702,707 B2 | 3/2004 | Krzesicki et al. | |
| 7,022,041 B2 | 4/2006 | Valente | |
| 7,232,399 B2 | 6/2007 | Valente | |
| 7,393,301 B2 | 7/2008 | Green, Jr. | |
| 7,775,928 B2 | 8/2010 | Zink | |
| 7,901,318 B2 | 3/2011 | Downs et al. | |
| 7,984,782 B2 | 7/2011 | Platt et al. | |
| 8,167,758 B2 | 5/2012 | Downs et al. | |
| 2003/0186774 A1 * | 10/2003 | Sullivan | F16C 19/56 475/230 |
| 2005/0101430 A1 * | 5/2005 | Ziech | B60K 17/36 475/230 |
| 2005/0245342 A1 * | 11/2005 | Pontanari | F16H 48/08 475/230 |

* cited by examiner

AXLE ASSEMBLY HAVING AN ANGULAR CONTACT BEARING THAT SUPPORTS A RING GEAR FOR ROTATION ON AN AXLE HOUSING

CROSS-REFERENCE TO RELATED APPLICATIONS

This application is a continuation-in-part of U.S. patent application Ser. No. 14/205,535 filed on Mar. 12, 2014, which claims the benefit of U.S. Provisional Application No. 61/787,547 field on Mar. 15, 2013. The entire disclosure of each of the above applications are incorporated herein by reference.

FIELD

The present disclosure relates to an axle assembly having a angular contact bearing that supports a ring gear for rotation on an axle housing.

BACKGROUND

This section provides background information related to the present disclosure which is not necessarily prior art.

Modern automotive vehicles, particularly light trucks, typically employ beam axles that are constructed in the style of a Banjo-type axle or a Salisbury-type axle. As is known in the art, a Banjo-type axle employs a housing that is fabricated of two identical beam halves, which are welded to one another on the front and rear edges where the beam halves abut one another. A housing for a conventional Banjo-type axle is disclosed in U.S. Pat. No. 2,674,783. As is also known in the art, a Salisbury-style axle employs a housing that includes a center carrier and a pair of axle tubes that are pressed into or otherwise permanently affixed to the center carrier. A housing for a Salisbury-type axle is disclosed in U.S. Pat. No. 7,878, 059.

SUMMARY

This section provides a general summary of the disclosure, and is not a comprehensive disclosure of its full scope or all of its features.

In one form, the present teachings provide an axle assembly that includes an axle housing, an input pinion, a ring gear, an angular contact bearing, and a differential assembly. The input pinion is received in the axle housing and is rotatable about a first axis. The input pinion has a plurality of pinion teeth. The ring gear is received in the axle housing and is a bevel gear having a plurality of ring gear teeth that are meshingly engaged with the pinion teeth. The ring gear teeth define a pitch angle. The angular contact bearing supports the ring gear for rotation on the axle housing about a second axis that is transverse to the first axis. The angular contact bearing has a first race, which is integrally formed into the ring gear, a second race, and a plurality of bearing balls disposed between the first and second races. The differential assembly has a differential case that is mounted to the ring gear for rotation therewith.

In another form, the present teachings provide an axle assembly that includes an axle housing, an input pinion, a ring gear, a four-point angular contact bearing, and a differential assembly. The input pinion is received in the axle housing and is rotatable about a first axis. The input pinion has a plurality of pinion teeth. The ring gear is received in the axle housing. The ring gear is a bevel gear having a plurality of ring gear teeth that are meshingly engaged with the pinion teeth. The ring gear teeth define a pitch angle. The four-point angular contact bearing supports the ring gear for rotation on the axle housing about a second axis that is transverse to the first axis. The four-point angular contact bearing has a first race, which is integrally formed into the ring gear, a second race, and a plurality of bearing balls that are disposed between the first and second races. The second race is defined by a first race member and a second race member. The first race member, the bearing balls and the first race cooperate to define a first contact angle, while the second race member, the bearing balls and the first race cooperate to define a second contact angle. The first contact angle is within ±15 degrees of being perpendicular to the pitch angle of the ring gear teeth. The differential assembly has a differential case that is mounted to the ring gear for rotation therewith.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
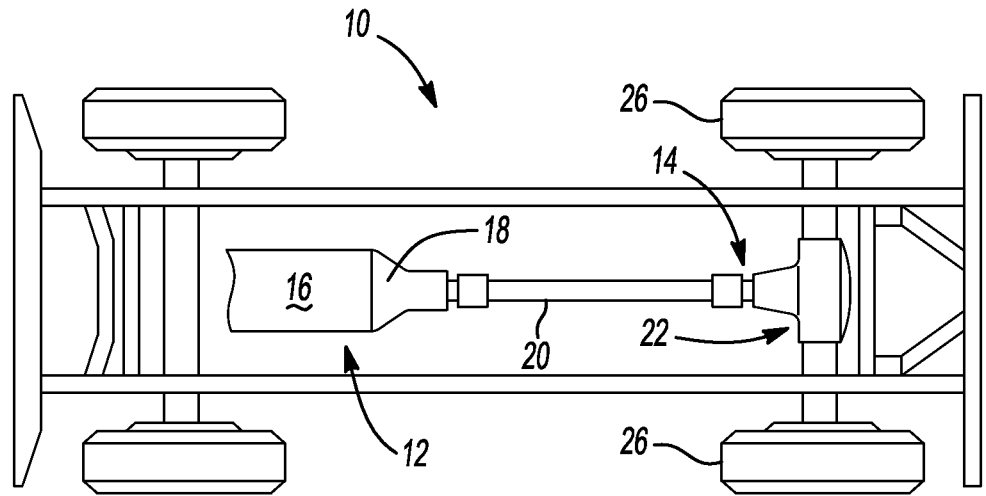
FIG. 1 is a schematic illustration of an exemplary vehicle having an axle assembly constructed in accordance with the teachings of the present disclosure.
Figure 3:
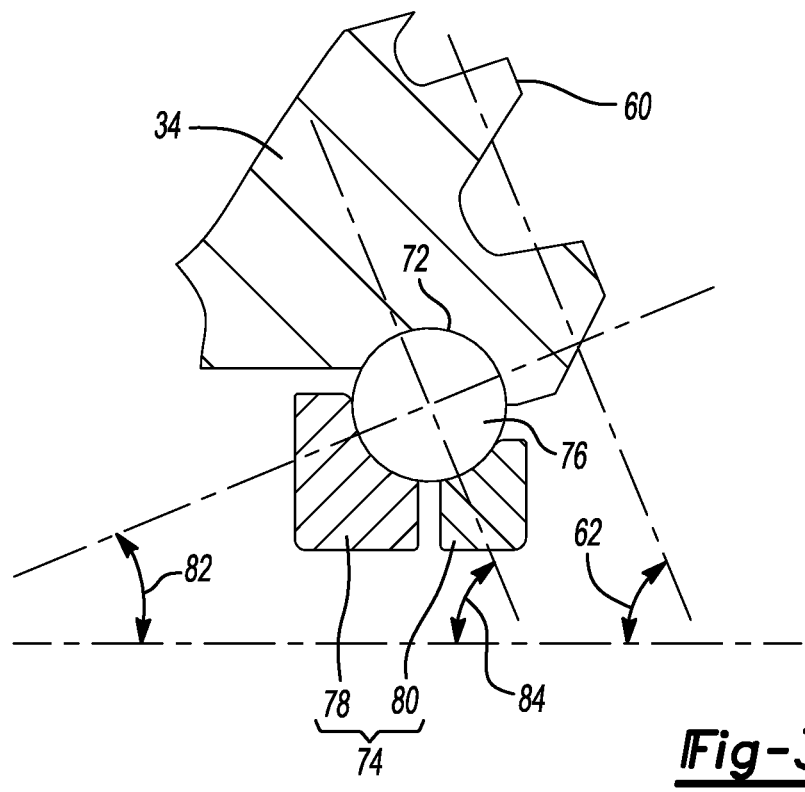
FIG. 3 is an enlarged portion of FIG. 2.

With reference to FIG. 1 of the drawings, an exemplary vehicle having an axle assembly (e.g., a rear axle assembly) constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a prop shaft 20 and a rear axle assembly 22. The propshaft 20 can couple the transmission 18 to the rear axle assembly 22 such that rotary power output of the transmission 18 is received by the rear axle assembly 22. The rear axle assembly 22 can distribute the rotary power to the rear vehicle wheels 26.

Figure 2:
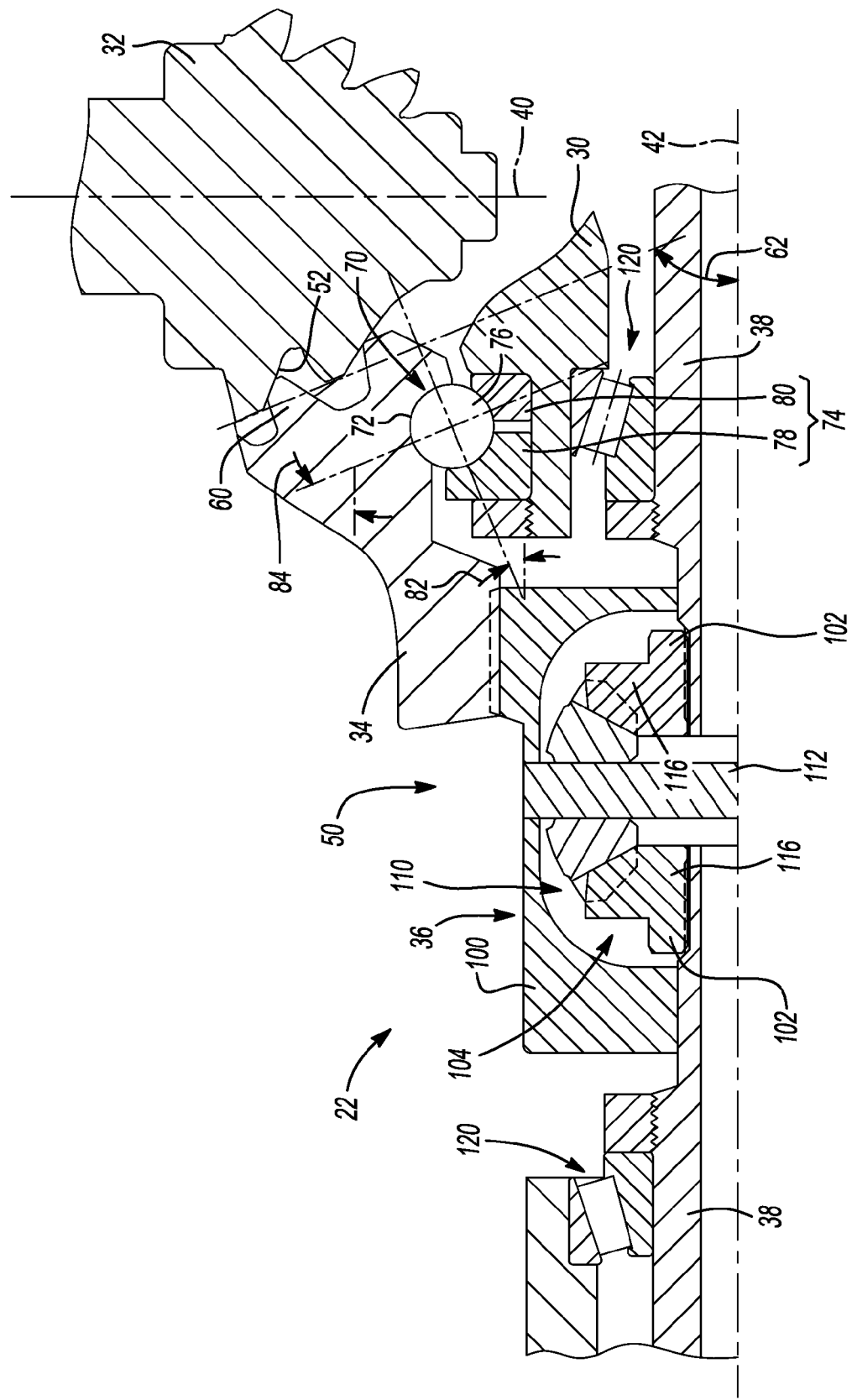
FIG. 2 is a longitudinal section view of a portion of the axle assembly of FIG. 1.

With reference to FIG. 2, the rear axle assembly 22 can include a housing 30, an input pinion 32, a ring gear 34, a differential assembly 36, and a pair of axle shafts 38. The input pinion 32 can be rotatable about a first axis 40, while the ring gear 34 and the differential assembly 36 can be rotatable about a second axis 42 that can be transverse (e.g., perpendicular) to the first axis 40.

The housing 30 can define a differential cavity 50 into which the differential assembly 36 can be received. The input pinion 32 can be received in the differential cavity 50 and can include a plurality of pinion teeth 52.

The ring gear 34 can be received in the differential cavity 50 and can include a plurality of ring gear teeth 60 that are meshingly engaged to the pinion teeth 52. The ring gear 34 can be a bevel gear (e.g., a spiral bevel gear) and the ring gear teeth 60 can define a pitch angle 62. The pitch angle 62 can be dimensioned in a desired manner, such as between 65 degrees and 55 degrees from the second axis 42, and preferably between 63 degrees and 57 degrees from the second axis 42.

An angular contact bearing 70 can support the ring gear 34 for rotation on the housing 30 about the second axis 42. The angular contact bearing 70 can have a first race 72, which can be integrally formed (i.e., machined) into the ring gear 34, a second race 74, which can be defined by one or more race members, and a plurality of bearing balls 76 that can be disposed between the first and second races 72 and 74. In the particular example provided, the bearing balls 76 are disposed in a single row, the angular contact bearing 70 is a four-point angular contact bearing, and the second race 74 is comprised of first and second race members 78 and 80 that can be positioned in a desired manner along the second axis 42 to preload the angular contact bearing 70 in a desired manner. Each of the first and second race members 78 and 80 cooperate with the bearing balls 76 and the first race 72 to define first and second contact angles 82 and 84, respectively. The first contact angle 82, which is defined by the first race member 78, the bearing balls 76 and the first race 72, is within a predetermined range of being perpendicular to the pitch angle 62 of the ring gear teeth 60. The predetermined range can be ±15 degrees, and more preferably, the predetermined range can be ±10 degrees. In the particular example provided, the pitch angle 62 of the ring gear teeth 60 is 60 degrees and the first contact angle 82 is 55 degrees. The second contact angle 84, which is defined by the second race member 80, the bearing balls 76 and the first race 72, can be generally perpendicular to the first contact angle 82 and generally parallel to the pitch angle 62 of the ring gear teeth 60.

In the example provided, the first race 72 is an outer bearing race of the (four-point) angular contact bearing 70, while the second race 74 is an inner bearing race of the (four-point) angular contact bearing 70 and as such, the first and second race members 78 and 80 are mounted on a tube-like protrusion 88 of the housing 30. The angular contact bearing 70 can be preloaded in any desired manner. In the example provided, a portion of the tube-like protrusion 88 is threaded and threadably engages a nut 90 that is employed to generate a clamping force to preload the angular contact bearing 70. While the first and second races 72 and 74 have been described as being outer and inner bearing races, respectively, those of skill in the art will appreciate that in the alternative, the first race 72 could be formed as an inner bearing race and the second race 74 could be formed as an outer bearing race.

The differential assembly 36 can comprise a differential case 100, a pair of output members 102, and a means 104 for permitting speed differentiation between the output members 102. The differential case 100 can be fixedly coupled to the ring gear 34 for rotation therewith and as such, conventional bearings for directly supporting the differential case 100 for rotation on the housing 30 are not needed. The output members 102 can be rotatably disposed about the second axis 42.

The speed differentiation means 104 can comprise any means for permitting speed differentiation between the output members 102. For example, the speed differentiation means 104 can include one or more clutches, such as friction clutches (not shown), that can be operated to permit/control speed differentiation between the output members 102. In the particular example provided, the speed differentiation means 104 comprises a differential gearset 110 having a cross-pin 112, a pair of differential pinions 114 (only one shown) and a pair of side gears 116 that are co-formed with the output members 102. The cross-pin 112 can be mounted to the differential case 100 and can be disposed generally perpendicular to the second axis 42. The differential pinions 114 can be rotatably mounted on the cross-pin 112 and can be meshingly engaged with the side gears 116.

Each of the output members 102 can be fixedly and non-rotatably coupled to an associated one of the side gears 116. Each of the output members 102 can comprise an internally splined structure that can be mounted on a corresponding one of the axle shafts 38. An axle shaft bearing 120 can support the inner end of each axle shaft 38 for rotation on the housing 30. Accordingly, it will be appreciated that the rear axle assembly 22 does not employ any bearings to directly support the differential case 100 for rotation on the housing 30.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
an axle housing;
an input pinion received in the axle housing and rotatable about a first axis, the input pinion having a plurality of pinion teeth;
a ring gear received in the axle housing, the ring gear being a bevel gear having a plurality of ring gear teeth that are meshingly engaged with the pinion teeth, the ring gear teeth defining a pitch angle;
an angular contact bearing supporting the ring gear for rotation on the axle housing about a second axis that is transverse to the first axis, the angular contact bearing having a first race, which is coupled to the ring gear for rotation therewith, a second race, and a plurality of bearing balls disposed between the first and second races; and
a differential assembly having a differential case, the differential case being mounted to the ring gear for rotation therewith;
wherein the second race comprises a first race member that cooperates with the bearing balls and the first race to define a first contact angle, and wherein the first contact angle is within ±15 degrees of being perpendicular to the pitch angle of the ring gear teeth.

2. The axle assembly of claim 1, wherein the pitch angle is between 65 degrees and 55 degrees from the second axis.

3. The axle assembly of claim 1, wherein the first contact angle is within ±10 degrees of being perpendicular to the pitch angle of the ring gear teeth.

4. The axle assembly of claim 2, wherein the pitch angle is between 63 degrees and 57 degrees from the second axis.

5. The axle assembly of claim 4, wherein the first contact angle is within ±10 degrees of being perpendicular to the pitch angle of the ring gear teeth.

6. The axle assembly of claim 4, wherein the pitch angle is 60 degrees from the second axis.

7. The axle assembly of claim 6, wherein the first contact angle is within ±10 degrees of being perpendicular to the pitch angle of the ring gear teeth.

8. The axle assembly of claim 1, wherein the first contact angle is within ±10 degrees of being perpendicular to the pitch angle of the ring gear teeth.

9. The axle assembly of claim 1, wherein the differential assembly further comprises a differential gearset that is configured to receive a rotary input from the differential case.

10. The axle assembly of claim 1, wherein the first race is integrally formed into the ring gear.

11. An axle assembly comprising:
an axle housing;
an input pinion received in the axle housing and rotatable about a first axis, the input pinion having a plurality of pinion teeth;
a ring gear received in the axle housing, the ring gear being a bevel gear having a plurality of ring gear teeth that are meshingly engaged with the pinion teeth, the ring gear teeth defining a pitch angle;
a four-point angular contact bearing supporting the ring gear for rotation on the axle housing about a second axis that is transverse to the first axis, the four-point angular contact bearing having a first race, which is coupled to the ring gear for rotation therewith, a second race, and a plurality of bearing balls that are disposed between the first and second races, the second race being defined by a first race member and a second race member, wherein the first race member, the bearing balls and the first race cooperate to define a first contact angle, wherein the second race member, the bearing balls and the first race cooperate to define a second contact angle, and wherein the first contact angle is within ±15 degrees of being perpendicular to the pitch angle of the ring gear teeth; and
a differential assembly having a differential case, the differential case being mounted to the ring gear for rotation therewith.

12. The axle assembly of claim 11, wherein the pitch angle is between 65 degrees and 55 degrees from the second axis.

13. The axle assembly of claim 12, wherein the first contact angle is within ±10 degrees of being perpendicular to the pitch angle of the ring gear teeth.

14. The axle assembly of claim 12, wherein the pitch angle is between 63 degrees and 57 degrees from the second axis.

15. The axle assembly of claim 14, wherein the first contact angle is within ±10 degrees of being perpendicular to the pitch angle of the ring gear teeth.

16. The axle assembly of claim 14, wherein the pitch angle is 60 degrees from the second axis.

17. The axle assembly of claim 16, wherein the first contact angle is within ±10 degrees of being perpendicular to the pitch angle of the ring gear teeth.

18. The axle assembly of claim 11, wherein the first contact angle is within ±10 degrees of being perpendicular to the pitch angle of the ring gear teeth.

19. The axle assembly of claim 11, wherein the differential assembly further comprises a differential gearset that is configured to receive a rotary input from the differential case.

20. The axle assembly of claim 11, wherein the first race is integrally formed into the ring gear.

* * * * *